(12) United States Patent
Kim et al.

(10) Patent No.: US 7,592,404 B2
(45) Date of Patent: Sep. 22, 2009

(54) HALF METALLOCENE CATALYST AND PROCESS FOR PREPARING SYNDIOTACTIC STYREN POLYMER USING THE SAME

(75) Inventors: Young-jo Kim, Daejeon (KR); Doh-yeon Park, Daejeon (KR); You-mi Jeong, Daejeon (KR); Min-hyung Lee, Daejeon (KR)

(73) Assignee: LG Chem, Ltd. (KR)

( * ) Notice: Subject to any disclaimer, the term of this patent is extended or adjusted under 35 U.S.C. 154(b) by 588 days.

(21) Appl. No.: 11/268,848

(22) Filed: Nov. 8, 2005

(65) Prior Publication Data

US 2007/0105710 A1    May 10, 2007

(51) Int. Cl.
*C08F 4/642* (2006.01)
*C07F 7/28* (2006.01)
*C08F 12/08* (2006.01)

(52) U.S. Cl. .............. 526/160; 526/127; 526/161; 526/347.2; 526/943; 556/11; 556/20; 556/43; 556/52

(58) Field of Classification Search .......... 556/20, 556/43, 53, 11, 52; 526/943, 127, 160, 161, 526/347.2
See application file for complete search history.

(56) References Cited

U.S. PATENT DOCUMENTS

| | | | |
|---|---|---|---|
| 4,680,353 A | 7/1987 | Ishihara et al. | 526/160 |
| 5,206,197 A | 4/1993 | Campbell, Jr. | 502/103 |
| 5,597,875 A | 1/1997 | Harwood et al. | 525/332.8 |

FOREIGN PATENT DOCUMENTS

| | | |
|---|---|---|
| CN | 1546538 | 11/2004 |
| KR | 1019980003097 | 2/1996 |
| KR | 100301135 | 6/2001 |
| KR | 20020012040 | 2/2002 |
| KR | 1020020012040 | 2/2002 |

OTHER PUBLICATIONS

"New half-sandwich metallocene catalysts for polyethylene and polystyrene", Authors: Youngjo Kim, et al.; Journal of Organometallic Chemistry 634, pp. 19-24 (2001).

(Continued)

*Primary Examiner*—Fred M Teskin
(74) *Attorney, Agent, or Firm*—Cantor Colburn LLP

(57) ABSTRACT

The present invention relates to a transition metal half metallocene catalyst with a noble structure for preparing syndiotatic styrene polymer having high activity, superior stereoregularity, high melting point and broad molecular weight distribution and a process for preparing styrene polymer using the same. The present invention provides a half metallocene catalyst having a single nucleus structure, in which a transition metal in Groups 3 to 10 on the periodic table is connected to a cycloalkanedienyl group or its derivative forming 5-coordinate bond on a side thereof and to any one of triethanolamine, N-alkyldiethanolamine and N-dialkylethanolamine group, all of which have a plurality of binding sites and high steric hinderance, on the other side thereof. The noble metallocene catalyst according to the present invention is useful for preparing highly syndiotatic vinyl aromatic polymer with broad molecular weight distribution and high activity.

18 Claims, 1 Drawing Sheet

OTHER PUBLICATIONS

"Syndiotactic polystyrene with very high molecular weight produced by sterically and electronically modified catalyst"; Authors: Youngjo Kim, et al.; Journal of Organometallic Chemistry 655, pp. 186-191 (2002).

"Preparation of syndiotactic poly(4-tert-butyldimethyl-silyloxystyrene) and poly(4-hydroxystyrene)"; Authors: Youngjo Kim, et al.; Macromol. Rapid Commun., pp. 1148-1155 (2000).

"New Titanatranes: Characterization and Styrene Polymerization Behavior"; Authors: Youngjo Kim, et al.; Organometallics, pp. 1127-1135 (2002).

"(Pentamethylcyclopentadienyl) titanatrane: A New Class of Catalyst for Syndiospecific Polymerization of Styrene", Authors: Youngjo Kim, et al.; Organometallics, pp. 36-39 (1999).

Michalczyk, Lucyna et al., Chelating Aryloxide Ligands in the Synthesis is of Titanium, Niobium, and Tantalum Compounds: Electrochemical Studies and Styrene Polymerization Activities, Organometallics, 2001, 20(26), 5547-5556.

Kim, Y. et al., New half-sandwich metallocene catalysts for polyethylene and polystyrene, Journal of Organometallic Chemistry, 2001, 634(1), 19-24.

Van Doom, Johannes A. et al., Tantalum and Titanium Alkylidene Complexes Bearing Phosphinoalkoxide Ligands, Reversible Ortho-Metalation of a Titanium Alkylidene, Organometallics, 1994, 13(11), 4271-7.

Lee, Ki-Soo et al.: "New group 4 half sandwich complexes containing triethanolamine ligand for polyethylene" Journal of Organometallic Chemistry 691(6), 1121-1125 CODEN; JORCAII ISSN: 0022-328X, 2006, XP005291128.

Kim, Youngjo et al.: "Syndiotactic polymerization of amino-functionalized strenes using (pentamethylcyclopentadienyl) titanatane/MMAO catalyst system", BULETIN of the Korean Chemical Society, 2004 25 (11), 1648-1652 CODEN: BKCSDE; ISSN: 0253-2964, 2004, XP008064357.

Kim, Youngjo et al.: Syndiotactic polystyrene with very high molecular weight produced by sterically and electronically modified catalyst, Journal of Organometallic Chemistry, 655(2002), 186-191 CODEN: JORCAI; ISSN: 0022-328X, 2002, XP004368764.

Kim, Youngjo et al.: "Preparation of syndiotactic poly (4-tert-butyldimethylsilyloxystrene) and poly(4-hydroxystrene)"Macromocecular Rapid Communications, 2000 21(No. 16), 1148-1155 CODEN: MRCOE3; ISSN: 1022-1336, 2000, XP008064364.

Menge, W. M. P. B et al.: "Monomeric and dimeric titanatranes" Inorganic Chemistry, 30(1991), 4628-31 CODEN: INOCAJ; ISSN: 0020-1669, 1991, XP008064356.

Taube, R. et al.: "Neue metallatrane of transition elements: chloro- and acetatozirconatrane", Zeitschrift Fuer Anorganische Und Allgemeine Chemie, 581 (1990), 89-98 CODEN: ZAACAB; ISSN: 0044-2313, 1990, XP008064439.

Severine, Kay et al.: "Macrobicyclic titanium(IV) complexes with C3-symmetric synthetic peptides", Angew. Chem., International Edition in English, (1995) 34(13/14), 1449-51 CODEN: ACIEATY; ISSN: 0570-0833, 1995, XP008064366.

[FIG.1]
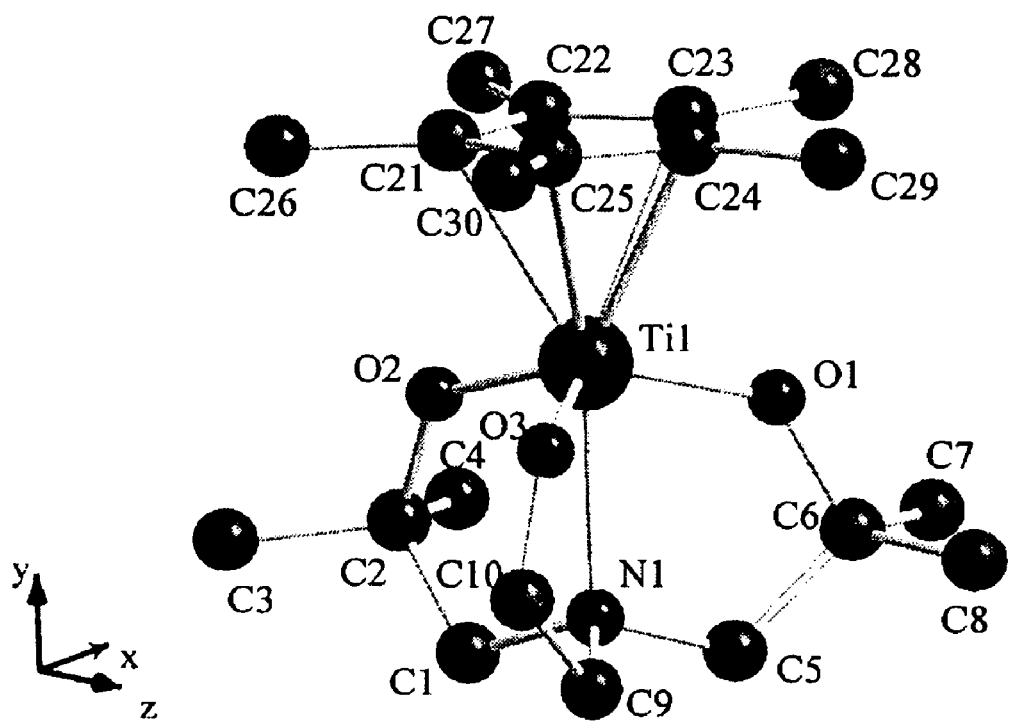

HALF METALLOCENE CATALYST AND PROCESS FOR PREPARING SYNDIOTACTIC STYREN POLYMER USING THE SAME

BACKGROUND OF THE INVENTION

1. Field of the Invention

The present invention relates to a metallocene catalyst for preparing vinyl aromatic polymers and a method for styrene polymerization using the same, and more particularly to a transition metal half metallocene catalyst with a noble structure for preparing syndiotactic styrene polymers having high activity, superior stereoregularity, high melting point and broad molecular weight distribution and a method for preparing styrene polymers using the same.

2. Background of the Related Art

Such syndiotactic polystyrene can be generally prepared using a metallocene catalyst composed of a Group 4 transition metal in the periodic table, such as titanium, zirconium or hafnium, and one or two cycloalkanedienyl groups. The cycloalkandienyl group includes cyclopentadienyl, indenyl, fluorenyl group and their derivatives.

For example, Ishihara et al. from Idemitus Kosan Co. has proposed that syndiotatic polysterene can be synthesized with high yield by using a catalyst system prepared by combining a titanium compound with an alkyl aluminum derivative in 1985. It was the first metalloscene catalyst for synthesizing syndiotatic polystyrene. U.S. Pat. No. 4,680,353 has disclosed a process for synthesizing syndiotactic polystyrene using a catalyst composed of a Group 4 atom as a metal center and various substituents including alkyl group and alkoxyl group in the presence of a cocatalyst such as alkylaluminum derivatives. The process disclosed in this patent, however, is disadvantageous in that it requires a complicated polymer purification process after polymerization to obtain pure styrene polymer due to the use of large amounts of the alkylaluminum derivatives for the polymerization and the catalyst used in the polymerization exhibits the low catalytic activity, for example 0.8 kg-PS(mmol-metal) (mol-styrene) or lower.

U.S. Pat. No. 5,206,197 has disclosed a process for synthesizing polystyren with a high degree of syndiotacticity using a catalyst composed of a metal selected from the group consisting of Groups 3 to 10 atoms in the periodic table, a cationic organic metal compound with or without having cyclopentadienyl group, and an anion organic compound for stabilizing the cationic organic metal compound which does not affect the polymerization activity in the presence of a small amount of alkylaluminum. This process, however, is also disadvantageous in that it requires the high mole ratio of styrene to catalyst, ranging from 3,500:1 to 500,000:1, resulting in a large amount of styrene residues left without taking part in polymerization.

U.S. Pat. No. 5,597,875 has disclosed a reactor for continuously producing syndiotactic polystyrene using a catalyst composed of a first component and a second component where the first component is a metal center selected from the group consisting of Groups 3 to 6 atoms and the second component is composed of an organic metal compound having various substituents including alkyl group and alkoxy group, and alkyl derivatives, or composed of cations from an organic metal compound and anions for stabilizing the organic metal compound.

However, as described above, most of the studies for preparation of polystyrene, which has disclosed so far, are commonly focused on pursuing diversity of a catalyst, including modifying cycloalkandienyl group bounded to a titanium atom by imparting various types of substituent groups to the cycloalkanedienyl group and substituting chloro group or methoxy group bound to the titanium atom at a different position with a different simple substituent.

For example, the inventors of the present application have recently reported a process for preparing syndiotatic polystyren having much higher activity and syndiotacticity as compared to the conventional ones, using a half metalloscene catalyst in which either chloro group or methoxy group is substituted with ethanolamine group or N-alkyldiethanolamine group having a plurality of binding sites, in the following international journals: (1) Yongjo Kim, Eunkee Hong, Min Hyung Lee, Jindong Kim, Yonggyu Han and Youngkyu Do, *Organometallics* 1999, 18, 36; (2) Yongjo Kim and Youngkyu Do, *Macromol. Rapid Comm.* 2000, 21, 1148; (3) Yongjo Kim, Yonggyu Han and Yongkyu Do, *J. Organomet. Chem.* 2001, 634, 19; and (4) Yongjo Kim, Yonggyu Han, Jeong-Wook Hwang, Myong Won Kim and Yongkyu Do, *Organometallics* 2002, 21, 1127; and (5) Yongjo Kim and Youngkyu Do, *J. Organomet. Chem.* 2002, 655, 186. Further, the same process was issued as Korean Patent No. 0301135 (invented by Youngjo Kim, Min Hyung Lee, Yongkyu Do, Yi-Yeol Lyu, Jin Hyung Lim and Hyun-Joon Kim). Korean Patent No. 0301135 has disclosed a catalyst composed of a metal center selected from Group 4 atoms of the periodic table, either cycloalkandienyl group or its derivative, and either triethanolamine group or N-alkylethanolamine group, and a polymerization process using the same catalyst in the presence of alkyl aluminum or one of its derivatives. Korean Patent No. 0365869 by Yongjo Kim, Minhyung Lee, Sungjin Park, Youngkyu Do, Sungwoong Yoon, Kiho Choi and Bogeun Song has disclosed a new catalyst synthesized by imparting an expensive substituent with high chirality to triethanolamine group and a process for synthesizing syndiotatic polystyrene with high syndiotacticity using the new catalyst. However, the catalysts disclosed in the two Korean Patents above are disadvantageous in that they exhibit high activity only in the presence of a large amount of alkyl aluminum oxane and the constituent imparted to the triethanolamine group or N-alkyldiethanolamine group is so expensive while they have an advantage of having steric hindrance, meaning high production cost for producing polystyren. For such reasons, it was difficult to commercialize the catalysts.

Accordingly, there is still a need for a catalyst that can be produced in low cost, easily treated and exhibit high activity and stability, needing a small amount of cocatalyst such as alkyl aluminum oxane.

SUMMARY OF THE INVENTION

The object of the present invention is to provide a new half metallocene catalyst for synthesizing syndiotatic polystyrene with high stereoregularity, high melting point and broad molecular weight distribution in the presence of a small amount of cocatalyst.

Another object of the present invention is to provide a process for polymerizing styrene monomers and copolymerizing with olefins using the metallocene catalyst.

Further another object f the present invention is to provide a process for synthesizing styrene-based polymers such as syndiotatic styrene polymers and styrene-olefin copolymers which have high stereoregularity, high melting point and broad molecular weight distribution, with high yield.

In order to achieve the objects and advantages above, the inventors of the present application have developed a new catalyst for preparing effectively styrene polymers with high syndiotacticity by imparting a substituent, which is cheap and capable of giving high steric hindrance, to triethanolamine group, N-alkyldiethanolamine group or N-dialkylethanolamine group.

The new catalyst according to the present invention is composed of a transition metal of Group 3 to 10 atoms in the periodic table, cycloalkanedienyl group or its derivative bounded to a side of the transition metal for inducing $\eta^5$ combination, and a ligand, such as triethnolamine, N-alkyldiethanol amine, or N-dialkylethanolamine group, bounded to the other side of the transition metal, where the ligand is combined with a substituent having two or more coordination sites and giving high steric hindrance, and has any one of the following formulas 1, 2, or 3:

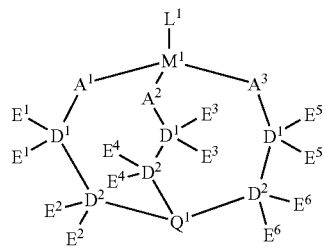

[Formula 1]

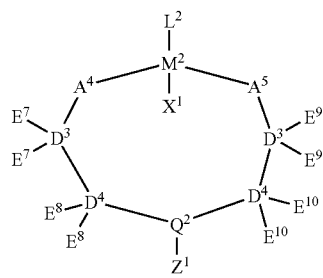

[Formula 2]

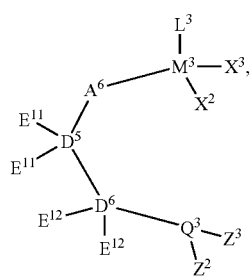

[Formula 3]

where, in the formulas 1, 2 and 3, $M^1$, $M^2$ and $M^3$ are transition metals independently selected from the group consisting of atoms in Groups 3, 4, 5, 6, 7, 8, 9, 10 on the Periodic Table, and Each of $L^1$, $L^2$ and $L^3$ is a cycloalkanedienyl ligand represented by any one of the following formulas 4, 5, 6, 7 or 8:

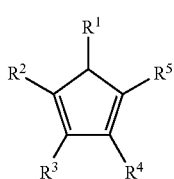

[Formula 4]

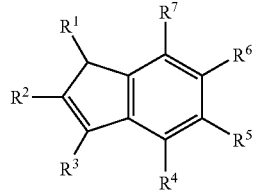

[Formula 5]

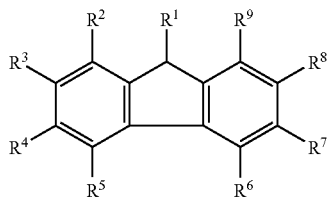

[Formula 6]

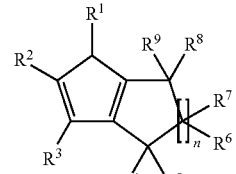

[Formula 7]

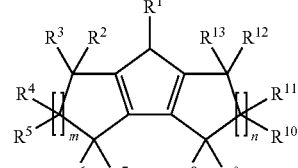

[Formula 8]

where in the formulas 4, 5, 6, 7 and 8, $R^1$, $R^2$, $R^3$, $R^4$, $R^5$, $R^6$, $R^7$, $R^8$, $R^9$, $R^{10}$, $R^{11}$, $R^{12}$, and $R^{13}$ are independently hydrogen atom, halogen, alkyl, $C_{3-20}$ cycloalkyl, $C_{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $C_{1-20}$ hydrocarbon group having either the straight or the branch structure and the aryl group is $C_{6-40}$ aromatic or heteroaromatic group) and each of m and n is an integer of 1 or more;

$X^1$, $X^2$, and $X^3$, which are σ-ligand functional groups, are independently hydrogen atom, halogen, alkyl, $C_{3-20}$ cycloalkyl, alkylsilyl, $C_{2-20}$ alkenyl, alkoxy, alkenyloxy, thioalkoxy, alkylsiloxy, amide, alkoxyalcohol, alcoholamine, aryl, alkylaryl, arylalkyl, arylsilyl, haloaryl, aryloxy, arylalkoxy, thioaryloxy, arylalkylsiloxy, arylamide, arylalkylamide, aryloxoalcohol, alcoarylamine, or arylaminoaryloxy group (here, the alkyl group is $C_{1-20}$ hydrocarbon group having the straight or branch structure and the aryl group is $C_{6-40}$ aromatic or hetero aromatic group);

$A^1$, $A^2$, $A^3$, $A^4$, $A^5$ and $A^6$ are functional groups bounded to a central metal (the transition metal) and are independently oxygen atom or sulfur atom;

$D^1$, $D^2$, $D^3$, $D^4$, $D^5$ and $D^6$ are functional groups and are independently alkyl, $C_{3-20}$ cycloalkyl, $C_{2-20}$ alkenyl or $C_{6-40}$ aryl group;

$E^1$, $E^2$, $E^3$, $E^4$, $E^5$, $E^6$, $E^7$, $E^8$, $E^9$, $E^{10}$, $E^{11}$, and $E^{12}$ are independently hydrogen atom, halogen, alkyl, $C_{3-20}$ cycloalkyl, $C_{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $C_{1-20}$ hydrocarbon group having the straight or branch structure and the aryl group is $C_{6-40}$ aromatic or heteroaromatic group);

$Q^1$, $Q^2$ and $Q^3$ are independently nitrogen or phosphorous; and $Z^1$, $Z^2$ and $Z^3$ are independently hydrogen atom, alkyl, $C_{3-20}$ cycloalkyl, $C_{2-20}$ alkenyl, alkylsilyl, haloalkyl, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $C_{1-20}$ hydrocarbon group having the straight or branch structure and the aryl group is $C_{6-40}$ aromatic or heteroaromatic group).

Particularly, in the formulas 1, 2 and 3, transannular interactions of coordinate bonds preferably exist between $M^1$ and $Q^1$; $M^2$ and $Q^2$; and $M^3$ and $Q^3$.

The metallocene catalyst having the formula 1, 2 and 3 can be preferably represented by any one of the following formulas 9, 10, 11, 12, 13, 14, 15, 16 or 17, and a structure of the chemical compound corresponding to the formula 10 is analyzed by an X-ray single crystal diffractometer and is shown in FIG. 1:

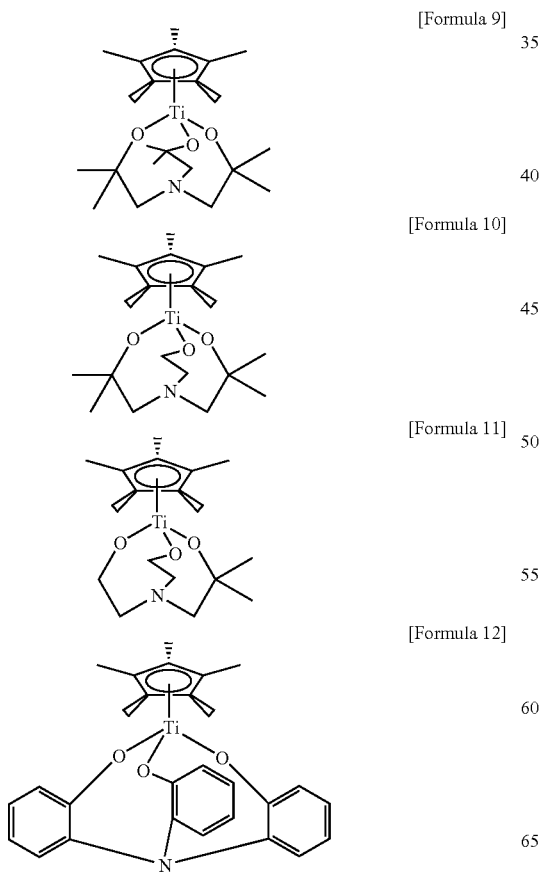

Further according to another embodiment of the present invention, there is provided a process for synthesizing polystyrene by homopolymerizing styrene monomers or copolymerizing styrene monomers with olefin monomers in the presence of a catalyst system, wherein the catalyst system comprises:

a) a main catalyst of a metallocene compound represented by the formula 1, 2 or 3 and b) one or more cocatalyst selected from the group consisting of alkylaluminoxane of the formula 18, alkylaluminum of the formula 19 and weak coordinate Lewis acid:

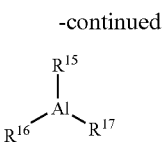

[Formula 19]

wherein, $R^{14}$ is a hydrogen atom, substituted or unsubstituted alkyl, substituted or unsubstituted $C_{3-20}$ cycloalkyl, aryl, alkylaryl or arylalkyl group; and $R^{15}$, $R^{16}$ and $R^{17}$ are independently hydrogen atom, halogen, substituted or unsubstituted alkyl, substituted or unsubstituted $C_{3-20}$ cycloalkyl, aryl, alkylaryl or arylalkyl group (here, the alkyl group is $C_{1-20}$ hydrocarbon group having straight or branch structure and the aryl group is $C_{6-40}$ aromatic or heteroaromatic group) where at least one of the $R^{15}$, $R^{16}$ and $R^{17}$ includes the alkyl group and n is an integer ranging from 1 to 100.

BRIEF DESCRIPTION OF THE DRAWINGS

The above and other objects, features and other advantages of the present invention will be more clearly understood from the following detailed description taken in conjunction with the accompanying drawing, in which;

FIG. 1 is an X-ray photograph illustrating a single crystal structure of a half metallocene compound with the formula 10 according to the present invention, obtained by using a single crystal X-ray diffractometer.

DETAILED DESCRIPTION OF THE PREFERRED EMBODIMENT

The present invention will now be explained in detail.

The present invention provides a half metallocene catalyst satisfying the above formula 1, 2 or 3 and a process for preparing styrene polymer using the metallocene catalyst as a main catalyst.

The metallocene catalyst of the present invention satisfying the above formula 1, 2 or 3 is a half metallocene compound in which a cycloalkandienyl group and a amine-based ligand are coordinated by a transition metal (central metal) of Groups 3 to 10 in the periodic table. The amine-based ligand has a plurality of binding sites and high steric hinderance and includes triethanolamine, N-alkylethanolamine and N-dialkylethanolamine. Therefore, since each central metal (transition metal) makes cationic polymerization active species during polymerization and the cationic polymerization ion active species are stabilized by the ligand having a plurality of binding sites, that is, the active species produced at a high temperature during the polymerization become stable by the ligand, it is expected that the metallocene catalyst according to the present invention exhibits much higher activity at a high polymerization temperature as compared to the conventional catalyst. Accordingly, it is further expected that the half metallocene catalyst of the present invention makes molecular weight control of polymers easy as well as is possible to produce styrene polymer having high polymerization activity, superior stereoregularity and high melting point even at a high polymerization temperature and at low cocatalyst to catalyst ratio.

The half metallocene catalyst of the formula 1, 2 and 3, having a ligand with a plurality of binding sites and high steric hinderance, such as triethanolamine, N-alkylethanolamine and N-dialkylethanolamine, can be prepared by i) preparing an alkali metal salt of a cycloalkandienyl ligand, ii) reacting the alkali metal salt with a transition metal compound having a leaving group which can be easily removed for substitution and then iii) reacting the transition metal with any of triethanolamine, N-alkyldiethanolamine and N-dialkylethanol ligand.

Alternatively, the half metallocene catalyst can be prepared by i) reacting a transition metal compound having a leaving group being easily separable for substitution with a triethanolamine, N-alkylethanolamine or N-dialkylethanolamine ligand, and then ii) reacting the transition metal compound of i) with an alkali metal salt of a cycloalkanedienyl group In a process for preparation of the metallocene catalyst above, the alkali metal salt of a cycloalkandienyl group includes lithium salt, sodium salt, and potassium salt. These salts can be prepared by reacing a ligand having a cycloalkanedienyl structure with n-butyllithium, sec-butyllithium, tert-butyllithium, methyllithium, sodium methoxide, sodium ethoxide, potassium tert-butoxide, potassium hydroxide, methylmagnesium chloride, ethylmagnesium bromide, dimethylmagnesium, lithium, sodium, potassium, etc. The cycloalkanedienyl alkali metal salt prepared by the reactions above include cyclopentadienyl lithium, cyclopentadienyl sodium, cyclopentadienyl potassium, cyclopentadienyl magnesium, methylcyclopenta dienyl lithium, methylcyclopentadienyl sodium, methylcyclopentadienyl potassium, tetramethylcyclopentadienyl lithium, tetramethylcyclopentadienyl sodium, tetramethylcyclopentadienyl potassium, indenyl lithium, indenyl sodium, indenyl potassium, fluorenyl lithium, etc.

The transition metal compound having a leaving group which is a ligand easily separable for substitution includes titanium tetrachloride, titanium tetrachloride ditetrahydrofuran, zirconium tetrachloride, hafnium tetrachloride, vanadium tetrachloride, titanium tetraiodide, titanium tetrabromide, titanium tetrafluoride, vanadium oxide trichloride, titanium tetraisopropoxide, chlorotitanium triisopropoxide, dichlorotitanium diisopropoxide, trichlorotitanium momoisopropoxide, chlorotitanium triphenoxide, chlorotitanium tributoxide, chlorotitanium triethoxide, etc.

The half metallocene compound includes cyclopentadienyltitanium trichloride, cyclopentadienylmethoxytitanium dichloride, cyclopentadienylmethoxytitanium monochloride, cyclopentadienyltitanium trimethoxide, methylcyclopentadienyltitanium trichloride, methylcyclopentadienylmethoxytitaiium dichloride, methylcyclopentadienylmethoxytitaium monochloride, methylcyclopentadienyltitanium trimethoxide, pentamethylcyclopentadienyl titanium trichloride, pentamethylcyclopentadienylmethoxytitanium dichloride, pentamethylcyclopentadienylmethoxy titanium monochloride, pentamethylcyclopentadienyltitanium trimethoxide, indenyltitanium trichloride, indenylmethoxytitanium dichloride, indenyldimethoxytitanium monochloride, and indenyltitanium trimetoxide.

The ligand having a plurality of binding sites and high steric hinderance, such as triethanolamine, N-alkylethanolamine and N-dialkylethanolamine, can be prepared by reacting ethanolamine with epoxide.

In the ligand compound of triethanolamine, N-alkyldiethanolamine or N-dialkylethanolamine compound, a substitution group giving steric hinderance ($E^1$ to $E^3$ in the formulas 1 to 3) may be $C_{1-20}$ cycloalkyl group, alkylsilyl group, $C_{6-20}$ aryl group, arylalkyl group or alkylaryl group where the alkyl component may be a straight structure or a branch structure. The examples of the ligand compound include 2-dialkyl-2-hydroxyethylamine, 3-dialkyl-3-hydroxypropylamine, 4-dialkyl-4-hydroxybutylamine, 5-dialkyl-5-hydroxypentylamine, 6-dialkyl-6-hydroxyhexylamine, N,N-bis(2-dialkyl- 2-hydroxyethyl)amine, N,N-bis(3-dialkyl-3-hydroxypropyl) amine, N,N-bis(4-dialkyl-4-hydroxybutyl)amine, N,N-bis (5-dialkyl-5-hydroxypentyl)amine, N,N-bis(6-dialkyl-6-hydroxyhexyl)amine, N,N,N-tris (2-dialkyl-2-hydroxyethyl) amine, N,N,N-tris (3-dialkyl-3-hydroxypropyl)amine, N,N, N-tris(4-dialkyl-4-hydroxybutyl)amine, N,N,N-tris (5-dialkyl-5-hydroxypentyl)amine, N,N,N-tris(6-dialkyl-6-hydroxyhexyl)amine, etc. These are alcholamine compounds, each containing one or more sterically limited hydroxyl alkyl group bounded to a nitrogen atom of an amine group. The examples of the ligand compound further include (2-dialkyl-2-hydroxyethyl) -2-hydroxyethylamine, (3-dialkyl-3-hydroxypropyl)-3-hydroxypropylamine, (4-dialkyl-4-hydroxybutyl)-4-hydroxybutylamine, (5-dialkyl-5-hydroxypentyl)-5-hydroxypentylamine, (6-dialkyl-6-hydroxyhexyl)-6-hydroxyhexylamine, (2-dialkyl-2-hydroxyethyl)-bis(2-hydroxyethyl)amine, (3-dialkyl-3-hydroxypropyl)-bis(3-hydroxypropyl)amine, (4-dialkyl-4-hydroxybutyl)-bis(4-hydroxybutyl)amine, (5-dialkyl-5-hydroxypentyl)-bis(5-hydroxypentyl)amine, (6-dialkyl-6-hydroxyhexyl)-bis(6-hydroxyhexyl)amine, etc. These are alcoholamine compounds, each necessarily containing one or more alcohol group with a sterically limited substitution group and also having an alcohol group without a sterically limited substitution group.

Further, $M^1$ to $M^3$ are preferably a Group 4 transition metal on the periodic table, and more preferably titanium, zirconium or hafnium.

The ligand having a cycloalkandienyl backbone includes cyclopentadienyl group, indenyl group, fluorenyl group, 4,5, 6,7-tetrahydroindenyl group, 2,3,4,5,6,7,8,9-octahydrofluorenyl group, etc.

The halogen group includes fluoro group, chloro group, bromo group and iodine group.

The $C_{1-20}$ alkyl, $C_{3-20}$ cycloalkyl, $C_{2-20}$ alkenyl, alkylsillyl, haloalkyl, alkoxy, alkylsilloxy, amino, alkoxyalkyl, thioalkoxyalkyl, alkylsilloxyalkyl, aminoalkyl, and alkylphosphinoalkyl groups preferably are methyl, ethyl, propyl, butyl, pentyl, hexyl, cyclopropyl, cyclobutyl, cyclopentyl, cyclohexyl, allyl, 2-butenyl, 2-pentenyl, methylsillyl, dimethylsillyl, trimethylsillyl, ethylsillyl, dietylsillyl, triethylsillyl, propylsillyl, dipropylsillyl, tripropylsillyl, butylsillyl, di-butylsillyl, tri-butylsillyl, butyldimethylsillyl, trifluoromethyl, methoxy, ethoxy, propoxy, butoxy, pentoxy, hexyloxy, methylsiloxy, dimethylsiloxy, trimethylsiloxy, ethylsiloxy, dietylsiloxy, triethylsiloxy, butyldimethylsiloxy, dimethylamino, diethylamino, dipropylamino, dibutylamino, pyrrolidine, piperidine, methoxyethyl, methoxypropyl, methoxybutyl, thiomethoxyethyl, thiomethoxybutyl, trimethylsilloxyethyl, dimethylaminoethyl, diethylphosphinobutyl groups, etc.

The $C_{6-40}$ aryl, arylalkyl, alkylaryl, arylsilyl, arylalkylsilyl, haloaryl, aryloxy, aryloxoalkyl, thioaryloxoalkyl, aryloxoaryl, arylsilloxy, arylalkylsilloxy, arylsilloxoalkyl, arylsilloxoaryl, arylamino, arylaminoalkyl, arylaminoaryl, and arylphosphinoalkyl groups preferably are phenyl, biphenyl, terphenyl, naphtyl, fluorenyl, benzyl, phenylethyl, phenylpropyl, tolyl, xylyl, butylphenyl, phenylsilyl, phenyldimethylsilyl, diphenylmethylsilyl, triphenylsilyl, chlorophenyl, pentafluorophenyl, phenoxy, naphthoxy, phenoxyethyl, biphenoxybutyl, thiophenoxyethyl, phenoxyphenyl, naphthoxyphenyl, phenylsiloxy, triphenylsiloxy, phenyldimethylsiloxy, triphenylsilloxethyl, diphenylsilloxphenyl, aniline, toluidine, benzylamino, phenylaminoethyl, phenylmethylaminophenyl, and diethylphosphinobutyl groups, etc.

Syndiotactic styrene polymer and styrene copolymer with various physical properties can be obtained using the half metallocene catalyst represented by the above formula 1, 2 or 3 as a main catalyst together with a cocatalyst in a styrene homopolymerization or copolymerization with olefin.

The cocatalyst used together with the half metallocene catalyst includes alkylaluminoxane having a repeating unit of the following formula 18 and week coordinate Lewis acid, and they are typically used together with alkylaluminum of the following formula 19.

The compound of the formula 18 may be linear, circular or network structure, and specifically, the examples thereof include methylaluminoxane, modified methylaluminoxane, ethylaluminoxane, butylaluminoxane, hexylaluminoxane, decylaluminoxane, etc.

The compound of the formula 19 includes trimethylaluminum, dimethylaluminum chloride, dimethylaluminum methoxide, methylaluminum dichloride, triethylaluminum, diethylaluminum chloride, diethylaluminum methoxide, ethylaluminum dichloride, tri-n-propylaluminum, di-n-propylaluminum chloride, n-propylaluminum chloride, triisopropylaluminum, tri-n-butylaluminum, tri-isobutylaluminum, di-isobutylaluminum hydride, etc.

The weak coordinate Lewis acid cocatalyst may be ionic or neutral type, and specifically, the examples include trimethylammonium tetraphenylborate, tributylammonium tetraphenylborate, trimethylammonium tetrakis(pentafluorophenyl) borate, tetramethylammonium tetrakis(pentafluorophenyl) borate, N,N-dimethylanilinium tetraphenylborate, dimethylanilinium tetrakis(pentafluorophenyl)borate, pyridinium tetraphenylborate, pyridinium tetrakis(pentafluorophenyl)borate, silver tetrakis(pentafluorophenyl)borate, ferro-cerium tetrakis(pentafluoropehnyl)borate, triphenylcarbenium tetrakis(pentafluorophenyl) borate, triphenylcarbenium tetrakis(3,5-bis(trifluoromethyl)phenyl) borate, sodium tetrakis(3,5-bis(trifluoromethyl)phenyl)borate, tris (pentafluorophenyl)borane, tris(2,3,4,5-tetrafluorophenyl) borane, tris(3,5-bis(trifluoromethyl)phenyl)borane, tris(2,4, 6-trifluorophenyl)borane, etc.

In styrene polymerization or copolymerization with olefin using the metallocene catalyst, the amount of the cocatalyst used together is not specifically limited but may vary according to the kinds.

The mole ratio of alkylaluminoxane and metallocene catalyst is in the range of from 1:1 to $10^6:1$, and preferably from 10:1 to $10^4:1$. The mole ratio of alkylaluminum that can be used together with alkylaluminoxane, and metallocene catalyst is in the range of from 1:1 to $10^4:1$.

The mole ratio of week coordinate Lewis acid and metallocene catalyst is in the range of from 0.1:1 to 50:1, and the mole ratio of alkylaluminum and metallocene catalyst is in the range of from 1:1 to 3000:1, and preferably from 50:1 to 1000:1.

The above described metallocene catalyst compounds can be supported on an inorganic or organic compound for use. A carrier material or a support material for supporting the metallocene compound thereon is not limited specifically but may be an inorganic compound with a large surface area and micropores on the surface thereof. The examples include silica, alumina, magnesium chloride ($MgCl_2$), bauxite, zeolite, $CaCl_2$, MgO, ZrO2, TiO2, $B_2O_3$, CaO, ZnO, BaO and $ThO_2$. Also, combinations of these inorganic support materials may be used, for example, $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO. The compounds above can contain a small amount of carbonate, sulfate or nitrate. Further, organic compounds including starch, cyclodextrin and polymer can also be used as the support material.

The monomers that can be polymerized with the catalyst system of the present invention include styrene, styrene derivatives, and olefin. Among them, styrene or a styrene derivative can be homopolymerized, respectively. Further, styrene and styrene derivatives can be compolymerized. Still further, styrene or styrene derivatives can be copolymerized with olefins.

The styrene derivatives have substituents on a benzene ring, and the substituents include halogen, $C_{1-10}$ alkyl, alkoxy, ester, thioalkoxy, sillyl, tin, amine, phosphine, halogenated alkyl, $C_{2-20}$ vinyl, aryl, vinylaryl, alkylaryl, aryl alkyl group, etc. Examples thereof include chlorostyrene, bromostyrene, fluorostyrene, p-methylstyrene, m-methylstyrene, ethylstyrene, n-butylstyrene, p-t-butylstyrene, dimethylstyrene, methoxystyrene, ethoxystyrene, butoxystyrene, methyl-4-styrenylester, thiomethoxystyrene, trimethylsillylstyrene, triethylsillylstyrene, t-butyldimethylsillylstyrene, trimethyltin styrene, dimethylaminostyrene, trimethylphosphinostyrene, chloromethylstyrene, bromomethylstyrene, 4-vinylbiphenyl, p-divinylbenzene, m-divinylbenzene, trivinylbenzene, 4,4'-divinylbiphenyl, vinylnaphthalene, etc.

The olefins that can be used in copolymerization with styrene or styrene derivatives include $C_{2-20}$ olefin, $C_{3-20}$ cycloolefin or cyclodiolefin, $C_{4-20}$ diolefin, etc., and examples thereof include ethylene, propylene, 1-butene, 1-pentene, 1-hexene, 1-octene, 1-decene, cyclopentene, cyclohexene, cyclopentadiene, cyclohexadiene, norbonene, methyl-2-norbonene, 1,3-butadiene, 1,4-pentadiene, 2-methyl-1,3-butadiene, 1,5-hexadiene, etc.

Polymerization using the catalyst system of the present invention can be conducted in slurry phase, liquid phase, gas phase or massive phase. When polymerization is conducted in slurry phase or liquid phase, solvent can be used as a polymerization medium, and example solvent include $C_{4-20}$ alkane or cycloalkane such as butane, pentane, hexane, heptane, octane, decane, dodecane, cyclopentane, methylcyclopentane, cyclohexane, etc.; $C_{6-20}$ aromatic arene such as benzene, toluene, xylene, mesitylene, etc.; and $C_{1-20}$ halogen alkane or halogen arene such as dichloromethane, chloromethane, chloroform, tetrachloromethane, chloroethane, 1,2-dichloroethane, 1,1,2,2-tetrachloroethane, chlorobenzene, 1,2-dichlorobenzene, 1,2,4-trichlorobenzene, etc. Mixtures of these solvents with a predetermined mixing ratio can be also used as the solvent. Polymerization in gas phase can be conducted when an inner pressure of a reactor is in the range of from 0.01 to 20 atm under solvent-free condition.

Polymerization temperature is −80 to 200° C., and preferably 0 to 150° C., and polymerization pressure is suitably 1 to 1000 atm including the pressure of comonomers for styrene homopolymerization or copolymerization with olefin.

According to the present invention, polymer can be prepared by i) introducing a solvent and monomers or monomers only into a reactor, elevating a temperature of the reactor, and then introducing alkylaluminum, cocatalyst and main catalyst metallocene compound into the reactor in this order, or ii) activating a main catalyst with alkylaluminum and cocatalyst, and then introducing the activated main catalyst into a reactor containing monomers, or iii) adding alkylaluminum to monomers before the monomers are introduced into a reactor, and then introducing a main catalyst activated with a cocatalyst to the reactor. And, the activation by bringing a main catalyst into contact with a cocatalyst is conducted at 0 to 150° C. for 0.1 to 240 minutes and preferably conducted for 0.1 to 60 minutes.

The amount of the main catalyst metallocene compound is not specifically limited, but is suitably $10^{-8}$ to 1.0 M on the basis of concentration of central metal in reaction system, and ideally $10^{-7}$ to $10^{-2}$ M.

Syndiotactic styrene polymers and copolymers obtained by polymerization using the catalyst system of the present invention can be controlled in a molecular weight range of 1000 to 10,000,000 and in a molecular weight distribution range of from 1.1 to 100 by controlling the kinds and the amounts of a main catalyst and a cocatalyst, reaction temperature, reaction pressure and concentration of monomers.

Hereinafter, the present invention will be described in more detail through examples and comparative examples. Embodiments are presented on the exemplary purpose but can not be construed to limit the scope of the present invention.

EXAMPLES

Example 1

Synthesis of Cp*Ti(OCMe$_2$CH$_2$)$_3$N(catalyst 1)

Preparation of (HOCMe$_2$CH$_2$)$_3$N 10 ml (20 mmol) of ammonia (NH$_3$, 2M solution in MeOH), 4.76 g (66 mmol) of isobutylene oxide and a stirring bar are put into a 20 ml screw capped vial, and then mixed in the vial at room temperature for 12 hours to obtain a colorless viscous solution. Then, the colorless viscous solution in the vial is transferred to a 250 ml flask and a washing solution obtained by washing the vials with 20 ml of acetone three times is added to the colorless viscous solution in the 250 ml flask. Solvent in the solution of the flask are removed in a rotary evaporator, and then the contents in the flask are dissolved in a small amount of hexane. The obtained hexane solution is maintained in a freezer, thereby to obtain colorless solid. The colorless solid is filtered and then dried under the vacuum condition. As a result, 4.6 g (yield 98%) of a white solid, (HOCMe$_2$CH$_2$)$_3$N, is obtained and its $^1$H NMR result is as follows:

$^1$H NMR (300.13 MHZ, CDCl$_3$, ppm): δ=2.55(s, 6H, CH$_2$), 1.16 (s, 18H, CMe$_2$). $^{13}$C{$^1$H}NMR (75.4 MHz, CDCl$_3$, ppm): δ=69.92(OCMe2), 61.02(CH$_2$N), 27.40 (OCMe$_2$).

Preparation of Cp*Ti(OCMe$_2$CH$_2$)$_3$N (Catalyst 1)

2 mmol (0.47 g) of HOCMe$_2$CH$_2$)$_3$N which is synthesized according to the example 1 process described above is put into a Schlenk flask and dissolved in 30 ml of toluene. Then, 6 mmol (0.84 ml) of triethylamine is introduced into the Schlenk flask, and the contents in the flask are mixed together, thereby obtaining a colorless clear solution. A temperature of the colorless solution is lowered to −78° C. On the other hand, 2 mmol (0.578 g) of Cp*TiCl$_3$ is dissolved in 30 ml of toluene in a different Schlenk flask, thereby obtaining a separate solution. The separate solution is gradually added to the colorless clear solution drop by drop. After all the toluene solution is added to the colorless clear solution, a temperature of the solution mixture is slowly raised to a room temperature, and the solution mixture in the Schlenk flask is agitated overnight. Then, the solution mixture is filtered using a celite filter to separate ammonium salt therefrom, thereby obtaining a yellow clear solution. Solvent in the yellow clear solution is removed under the vacuum condition, and the resultant material after the solvent removal is dried for a long time. As a result, 0.8 g (yield 97%) of yellowish orange solid, catalyst 1 of the formula 9, is obtained and its $^1$H NMR result is as follows:

$^1$H NMR (300.13 MHz, CDCl$_3$, ppm): δ=3.16(dd, J$_{1,2}$=6.6 Hz, J$_{1,3}$=11.9 Hz, 3H, CH$_2$), 2.81(dd, J$_{1,2}$=7.4 Hz, J$_{1,3}$=11.9 Hz, 3H, CH$_2$). 1.96 (s, 15H, C$_5$Me$_5$), 1.20 (s, 9H, CMe$_2$), 1.11 (s, 9H, CMe$_2$). $^{13}$C {$^1$H} NMR (75.4 MHz, CDCl$_3$, ppm): δ=125.7(C$_5$Me$_5$), 84.34(OCMe$_2$) 61.35(CH$_2$N), 31.17 (OCMe$_2$) 29.30(OCMe$_2$), 11.95(C$_5$Me$_5$). EI-MS:m/z=414.

[Formula 9]

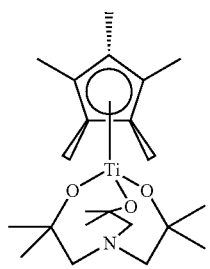

Example 2

Synthesis of Cp*Ti(OCMe$_2$CH$_2$)$_2$N(CH$_2$CH$_2$O) (catalyst 2)

Preparation of (HOCMe$_2$)$_2$N (CH$_2$CH$_2$OH)

3.05 g (50 mmol) of ethanolamine, 7.93 g (110 mmol) of isobutylene oxide and a stirring bar are put into a screw capped vial of 20 ml, and mixed together at a room temperature for 12 hours to obtain a colorless viscous solution. The colorless viscous solution is transferred to a 250 ml flask and a washing solution obtained by washing the vial with 20 ml of acetone three times is added to the colorless viscous solution. Solvent in the colorless solution is removed in a rotary evaporator and then the resultant material after the solvent evaporation is dried under the vacuum condition for a long time. As a result, log (yield 97%) of waterwhite oil (HOCMe$_2$CH$_2$)$_2$N (CH$_2$CH$_2$OH) is obtained, and its $^1$H NMR result is as follows:

$^1$H NMR (300, 13 MHz, CDCl$_3$, ppm): δ=3.60(t, J=5.4 Hz, 2H, CH$_2$CH$_2$N), 2.77(t, J=5.4 Hz, 2H, CH$_2$CH$_2$N), 2.53 (s, 4H, CMe$_2$CH$_2$N), 1.17(s, 12H, CMe$_2$). $^{13}$C{$^1$H} NMR (75.47 MHz, CDCl$_3$, ppm): δ=71.03(OCH$_2$), 68.81(OCMe$_2$), 61.39(NCH$_2$), 60.49(NCH$_2$), 28.21(OCMe$_2$).

Preparation of Cp*Ti(OCM$_2$CH$_2$)$_2$N(CH$_2$CH$_2$O) (catalyst 2)

1.45 mmol (0.298 g) of (HOCMe$_2$CH$_2$)$_2$N(CH$_2$CH$_2$OH) which is synthesized according to the example 2 process described above is put into a Schlenk flask and dissolved in 30 ml of toluene. Then, 4.8 mmol (0.7 ml) of triethylamine is introduced into the Schlenk flask, and the contents in the flask are mixed together to obtain a colorless clean solution. The temperature of the colorless clear solution is lowered to -78° C. On the other hand, 1.45 mmol (0.42 g) of Cp*TiCl$_3$ is dissolved in 30 ml of toluene in a different Schlenk flask, thereby obtaining a separate solution. The separate solution is gradually added to the colorless clear solution drop by drop. After all the separate solution is added to the colorless clear solution, a temperature of the solution mixture in the Schlenk flask is raised to a room temperature, and the solution mixture is agitated overnight. Then, the solution mixture is filtered using a celite filter to separate ammonium salt therefrom, thereby obtaining a yellow clear solution. Solvent in the yellow clear solution is removed under the vacuum condition, and the resultant material after the solvent removal of the yellow clear solution is dried for a long time. As a result, 0.56 g (yield 100%) of yellow solid, catalyst 2 of the formula 10, is obtained, and its $^1$H NMR result is as follows: Further, the structure of this catalyst is analyzed by an X-ray diffraction apparatus and its result is shown in FIG. 1.

$^1$H NMR (300, 13 MHz, CDCl$_3$, ppm): δ=4.10(t, J=5.5 Hz, 2H, CH$_2$CH$_2$N), 2.94-2.80(m, 6H, CH$_2$CH$_2$N and CMe$_2$CH$_2$N), 1.85(s, 15H, C$_5$Me$_5$), 0.90(d, J=7.4 Hz, 12H, CMe$_2$), $^{13}$C{$^1$H} NMR (75.47 MHz, CDCl$_3$, ppm): δ=121.4 (C$_5$Me$_5$), 81.29(OCH$_2$), 70.91(OCMe$_2$) 70.50(NCH$_2$), 63.35 (NCH$_2$), 31.79(OcMe$_2$), 31.14(OCMe$_2$), 11.13(C$_5$Me$_5$), EI-MS: m/z=385.

[Formula 10]

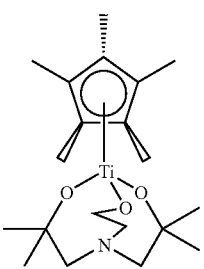

Example 3

Synthesis of Cp*Ti(OCMe$_2$CH$_2$)$_2$N(CH$_2$CH$_2$O) (catalyst 3)

Preparation of (HOCMe$_2$CH$_2$)N(CH$_2$CH$_2$OH)$_2$ 5.26 g (50 mmol) of diethanolamine, 3.61 g (55 mmol) of isobutylene oxide and a stirring bar are put into a 20 ml screw capped vial, and mixed together at a room temperature for 12 hours to obtain a colorless viscous solution. The colorless viscous solution is transferred to a 250 ml flask and a washing solution obtained by washing the vial with acetone three times is added to the colorless viscous solution. Solvent in the colorless viscous solution are removed in a rotary evaporator, and then the resultant material after the solvent evaporation is dried under the vacuum condition for a long time. As a result, 8.6 g (yield 97%) of waterwhite oil (HOCMe$_2$CH$_2$)N (CH$_2$CH$_2$OH)$_2$ is obtained, and its $^1$H NMR result is as follows:

$^1$H NMR (300, 13 MHz, CDCl$_3$, ppm): δ=4.62(br s, 3H, OH) 3.58(t, J=4.7 Hz, 4H, CH$_2$CH$_2$N), 2.65(t, J=4.7 Hz, 2H, CH$_2$CH$_2$N), 2.42 (s, 2H, CMe$_2$CH$_2$N), 1.15(s, 6H, CMe$_2$). $^{13}$C{$^1$H} NMR (75.47 MHz, CDCl$_3$, ppm): δ=70.73(OCH$_2$), 66.85(OCMe$_2$) 59.94(NCH$_2$), 59.21(NCH$_2$), 27.73 (OCMe$_2$).

Preparation of Cp*Ti(OCM$_2$CH$_2$)N(CH$_2$CH$_2$O)$_2$ (catalyst 3)

1.45 mmol (0.257 g) of (HOCMe$_2$CH$_2$)N(CH$_2$CH$_2$OH)$_2$ which is synthesized according to the example 3 process described above is put into a Schlenk flask and dissolved in 30 ml of toluene. Then, 4.8 mmol (0.7 ml) of triethylamine is introduced into the Schlenk flask, and the contents in the flask are mixed together, thereby obtaining a colorless clear solution. The temperature of the colorless clear solution is lowered to −78° C. On the other hand, 1.45 mmol (0.42 g) of Cp*TiCl$_3$ is dissolved in 30 ml of toluene in a different Schlenk flask, thereby obtaining a separate solution. The separate solution is gradually added to the colorless clea solution drop by drop. After all the separate solution is dropped to the colorless solution, a temperature of the solution mixture in the Schlenk flask is raised to a room temperature, and the solution mixture is further agitated overnight. Next day, the solution mixture is filtered using a celite filter to separate ammonium salt therefrom, thereby obtaining a yellow clear solution. Solvent in the yellow clear solution is removed under vacuum, and the resultant material after the removal of solvent from the yellow clear solution is dried for a long time. As a result, 0.51 g (yield 98%) of yellow solid, catalyst 3 of the following formula 11 is obtained, and its $^1$H NMR result is as follows:

$^1$H NMR (300, 13 MHz, CDCl$_3$, ppm): δ=4.17(t, J=5.4 Hz, 4H, CH$_2$CH$_2$N), 2.93-2.85(m, 6H, CH$_2$CH$_2$N and CMe$_2$CH$_2$N), 1.86(s, 15H, C$_5$Me$_5$), 0.90(s, 6H, CMe$_2$). $^{13}$C{$^1$H} NMR (75.47 MHz, CDCl$_3$, ppm): δ=121.9(C$_5$Me$_5$), 81.94(OCH$_2$), 70.70(OCMe$_2$), 67.46(NCH$_2$), 59.56 (NCH$_2$), 32.13 (OCMe$_2$), 11.07 (C$_5$Me$_5$), EI-MS: m/z=357.

[Formula 11]

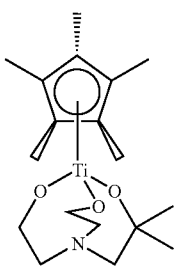

Example 4

Synthesis of Cp*Ti(OPh)3N(catalyst 4)

2 mmol (0.59 g) of tris(2-hydroxyphenyl)amine is dissolved in a toluene in a Schlenk flask. Then, 6 mmol(0.84 ml) of triethylamine is added to the tris(2-hydroxyphenyl)amine-toluene solution, thereby obtaining a colorless clear solution. The temperature of the colorless clear solution is lowered to −78° C. Then, 2 mmol(0.578 g) of Cp*TiCl$_3$ is dissolved in 30 ml of toluene in a different Schlenk flask, thereby obtaining a solution. This solution is gradually added to the colorless clear solution drop by drop. After all the solution is dropped to the colorless clear solution, a temperature of the solution mixture is raised to a room temperature and then the solution mixture is agitated overnight. Next, the solution mixture is filtered using a celite filter to separate ammonium salt therefrom, thereby obtaining a yellow clear solution. Solvent in the yellow clear solution is removed under vacuum, and the resultant material after the removal of solvent from the yellow clear solution is dried for a long time. As a result, 0.49 g (yield 52%) of orange-yellow solid, catalyst 4 of the following formula 12 is obtained, and its $^1$H NMR result is as follows:

$^1$H NMR (300, 13 MHz, CDCl$_3$, ppm): δ=7.43(d, J=7.9 Hz, 3H, Ph-H), 7.04(t, J=8.0 Hz, 3H, Ph-H), 6.69(t, J=7.9 Hz, 3H, Ph-H), 6.51(d, J=8.0 Hz, 3H, Ph-H), 2.15 (s, 15H, C$_5$Me$_5$). $^{13}$C{$^1$H} NMR (75.47 MHz, CDCl$_3$, ppm): δ=164.0(Ph), 1(Ph), 128.9(Ph), 128.5(Ph), 126.0(C$_5$Me$_5$), 119.2(Ph), 116.6(Ph), 11.56(C$_5$Me$_5$). EI-MS: m/z=473.

[Formula 12]

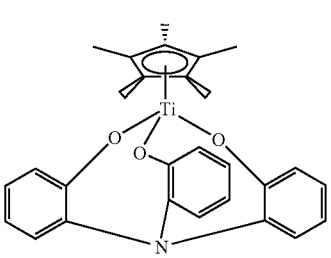

Example 5

Synthesis of Cp*TiCl{(OCMe$_2$CH$_2$)$_2$NMe} (catalyst5)

Preparation of (HOCMe$_2$ CH$_2$)$_2$NMe 25 ml (50 mmol) of methylamine (2M solution in MeOH), 7.93 g(110 mmol) of isobutylene oxide and a stirring bar are put into a 20 ml screw capped vial and mixed together at 50° C. for 12 hours, thereby obtaining a colorless viscous material. A temperature of the colorless viscous material is lowered to a room temperature, and then the colorless viscous material is transferred to a 250 ml flask. Than, a washing solution obtained by washing the vial with 20 ml of acetone three times is added to the contents in the same flask. Solvent in the contents in the flask is removed in a rotary evaporator and then the resultant material after the removal of the solvent is dried under vacuum for a long time to obtain 8.7 g(yield 99%) of waterwhite oil, (OHCMe$_2$CH$_2$)$_2$NMe, and its $^1$H NMR result is as follows:

$^1$H NMR (300. 13 MHz, CDCl$_3$, ppm): δ=3.86(s, 2H, OH), 2.46(s, 4H, CMe$_2$ CH$_2$N), 2.42(s, 3H, NMe), 1.10(s, 12H, CMe$_2$). $^{13}$C {$^1$H} NMR (75.47 MHz, CDCl$_3$, ppm): δ=72.05 (OCMe$_2$), 71.48(OCMe$_2$), 61.39(NCH$_2$), 60.49 (NMe), 28.21(OCMe$_2$).

Preparation of Cp*TiCl{(OCMe$_2$CH$_2$)$_2$NMe} (catalyst 5)

2.42 ml (0.424 g) of (HOCMe$_2$CH$_2$)$_2$NMe which is synthesized according to the example 5 process described above is transferred to a Schlenk flask and dissolved in 30 ml of toluene. Then, 5 mmol(0.81 ml) of triethylamine is added to the solution in the Schlenk flask, thereby obtaining an colorless clear solution. A temperature of the colorless clear solution is lowered to −78° C. On the other hand, 2.42 mmol(0.7 g) of Cp*TiCl$_3$ is dissolved in 30 ml of toluene in a different Schlenk flask to obtain a separate solution. This separately prepared solution is gradually added to the colorless clear solution drop by drop. After all the separately prepared solution is added to the colorless clear solution, the temperature of the solution mixture is raised to a room temperature and the solution mixture is agitated overnight. Next day, the solution mixture is filtered using a celie filter to separate ammonium salt therefrom, thereby obtaining a yellow clear solution. The solvent in the yellow clear solution is removed under vacuum, and the resultant material after the removal of the solvent is dried for a long time, so that 0.85 g (yield 89%) of yellow solid, catalyst 5 of the following formula 13 is obtained and its $^1$H NMR result is as follows:

$^1$H NMR (300, 13 MHz, CDCl$_3$, ppm): δ=2.67(q, J=11.6 Hz, 4H, CH$_2$N), 2.58(s, 3H, NMe), 2.04(s, 15H, C$_5$Me$_5$), 1.18(d, J=4.4 Hz, 12H, CMe$_2$). $^{13}$C{$^1$H} NMR (75.47 MHz, CDCl$_3$, ppm): δ=125.1(C$_5$Me$_5$), 88.13(OCMe$_2$), 73.68(NCH$_2$), 50.29(NMe), 28.59(OCMe$_2$), 12.17 (C$_5$Me$_5$). EI-MS: m/z=393.

[Formula 13]

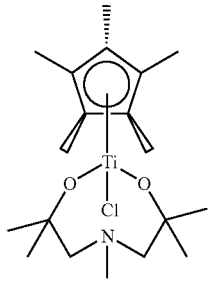

Example 6

Synthesis of Cp*Ti(OMe){(OCMe$_2$CH$_2$)$_2$NMe} (catalyst 6)

2.42 mmol (0.424 g) of a ligand (HOCMe$_2$)$_2$NMe synthesized according to the example 5 process is transferred to a Shlenk flask and dissolved in 30 ml of toluene in the flask. A temperature of the solution in the flask is lowered to −78° C. Then, a separate solution is prepared by dissolving 2.42 mmol (0.67 g) of Cp*Ti(OMe)$_3$ in 30 ml of toluene. The separate solution is gradually added to the ligand solution in the flask drop by drop. After all the solution is added to the ligand solution, the temperature of the solution mixture is gradually raised to a room temperature, and agitated overnight. Next, the solvent in the solution mixture is removed under the vacuum condition and the resultant material after the removal of the solvent is dried for a long time. As a result, 0.83 g (yield 92%) of yellow solid, catalyst 6 of the following formula 14 is obtained, and its $^1$H NMR result is as follows:

$^1$H NMR (300, 13 MHz, CDCl$_3$, ppm): δ=4.01(s, 3H, OMe), 2.73(q, J=12.0 Hz, 4H, CH$_2$N), 2.61(s, 3H, NMe), 2.01(s, 15H, C$_5$Me$_5$), 1.21(d, J=5.2 Hz, 12H, CMe$_2$). $^{13}$C{$^1$H} NMR (75.47 MHz, CDCl$_3$, ppm): δ=125.9(C$_5$Me$_5$), 87.44(OCMe$_2$), 75.15(NCH$_2$) 62.32(OMe), 51.33(NMe), 29.43(OCMe$_2$), 11.29(C$_5$Me$_5$).

[Formula 14]

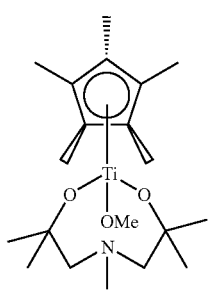

Example 7

Synthesis of Cp*TiCl{(OCMe$_2$CH$_2$)NMe (CH$_2$CH$_2$O)} (catalyst 7)

Preparation of (HOCMe$_2$CH$_2$)NMe(CH$_2$CH$_2$OH)

7.51 g (100 mmol) of N-methylethanolamine, 7.93 g (110 mmol) of isobutylene oxide and a stirring bar are put into a 20 ml screw capped vial and mixed together in the vial at 50° C. for 12 hours, and then a reaction temperature of the reaction mixture is lowered to a room temperature, thereby obtaining a colorless viscous solution. The colorless viscous solution is transferred to a 250 ml flask. On the other hand, a washing solution obtained by washing the vial with 20 ml of acetone three times is added to the colorless viscous solution in the flask. All the solvent in the solution in the flask are removed in a rotary evaporator, and the resultant material after the removal of solvent is dried under the vacuum condition for a long time, thereby obtaining 14.3 g (yield 97%) of a water-white oil, (HOCMe$_2$CH$_2$)NMe(CH$_2$CH$_2$OH), and its $^1$H NMR result is as follows:

$^1$H NMR (300, 13 MHz, CDCl$_3$, ppm): δ=3.56(t, J=5.4 Hz, 2H, NCH$_2$CH$_2$), 3.41(br, s, 2H, OH), 2.60(t, J=5.5 Hz, 2H, NCH$_2$CH$_2$), 2.37(s,3H, NMe), 2.34(s, 2H, CMe$_2$CH$_2$N), 1.12(s, 6H, CMe$_2$). $^{13}$C{$^1$H} NMR (75.47 MHz, CDCl$_3$, ppm): δ=70.72(OCH$_2$) 68.29(OCMe$_2$), 61.75(NCH$_2$), 45.46 (NMe), 27.62(OCMe$_2$).

Preparation of Cp*TiCl{(OCMe$_2$CH$_2$)NMe (CH$_2$CH$_2$O)} (catalyst 7)

2.42 mmol (0.356 g) of (HOCMe$_2$CH$_2$)NMe (CH$_2$CH$_2$OH) which is synthesized according to the example 7 process described above is put into a Schlenk flask and dissolved in 30 ml of toluene. Then, 5 mmol (0.8 ml) of triethylamine is introduced into the Schlenk flask, and the contents in the Schlenk flask are mixed together, thereby obtaining a colorless clear solution. A temperature of the colorless clear solution is lowered to −78° C. On the other hand, 2.42 mmol (0.7 g) of Cp*TiCl$_3$ is dissolved in 30 ml of toluene in a different Schlenk flask to obtain a separate solution. The separate solution is gradually added to the colorless clear solution drop by drop. After dropping all the separate solution to the colorless solution, a temperature of the solution mixture in the Schlenk flask is gradually raised to a room temperature, and the solution mixture is further agitated overnight. Then, the solution mixture is filtered using a celite filter to separate ammonium salt therefrom, thereby obtaining a yellow clear solution. Solvent in the yellow clear solution is removed under the vacuum condition, and the resultant material after the removal of solvent is dried for a long time. As a result, 0.77 g (yield 88%) of yellow solid, catalyst 7 of the following formula 15 is obtained, and its $^1$H NMR result is as follows:

$^1$H NMR (300, 13 MHz, CDCl$_3$, ppm): δ=4.36-4.28(m, 2H, CH$_2$O), 2.86-2.79 (m, 1H, CH$_2$CH$_2$N), 2.72(d, J=3.3 Hz, 2H, CMe$_2$CH$_2$N), 2.70-2.61(m, 1H, CH$_2$CH$_2$N), 2.58(s, 3H, NMe), 1.97 (s, 15H, C$_5$Me$_5$), 1.22(d, J=10 Hz, 6H, CMe$_2$). $^{13}$C{$^1$H} NMR (75.47 MHz, CDCl$_3$, ppm): δ=125.8(C$_5$Me$_5$), 85.95(OCH$_2$) 72.88(OCMe$_2$), 68.29(CH$_2$CH$_2$N) 61.60

(CMe$_2$CH$_2$N) 47.79(NMe), 31.92 (OCMe$_2$), 31.16 (OCMe$_2$), 12.00 (C$_5$Me$_5$). EI-MS: m/z=363.

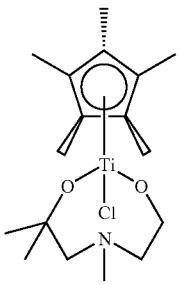

[Formula 15]

Example 8

Synthesis of Cp*Ti(OMe){(OCMe$_2$CH$_2$)NMe(CH$_2$CH$_2$O)} (catalyst 8)

2.42 mmol (0.356 g) of the ligand, (HOCMe$_2$CH$_2$)NMe(CH$_2$CH$_2$OH), which is synthesized according to the example 7 process is put into a Schlenk flask and dissolved in 30 ml of toluene in the Schlenk flask. A temperature of the ligand and toluene solution is lowered to −78° C. Then, 2.42 mmol(0.67 g) of Cp*Ti(OMe)$_3$ is dissolved in 30 ml of toluene in a different Schlenk flask, thereby obtaining a separate solution. This separate solution is gradually added to the ligand and toluene solution drop by drop. After all the separate solution is added to the ligand and tolune solution, a temperature of the solution mixture is gradually raised to a room temperature and then the solution mixture is agitated overnight. Then, solvent in the solution mixture is removed under the vacuum condition, and the resultant material obtained after the removal of the solvent is dried for a long time. As a result, 0.76 g (yield 91%) of yellow solid, catalyst 8 of the following formula 16 is obtained, and its $^1$H NMR result is as follows:

$^1$H NMR (300, 13 MHz, CDCl$_3$, ppm): δ=4.25(m, 2H, CH$_2$O), 4.01 (s, 3H, OMe), 2.77(m, 1H, CH$_2$CH$_2$N), 2.65(d, J=3.8 Hz, 2H, CMe$_2$CH$_2$N), 2.85(m, 1H, CH$_2$CH$_2$N), 2.51(s, 3H, NMe), 2.01 (s, 15H, C$_5$Me$_5$), 1.19(d, J=9.1 Hz, 6H, CMe$_2$). $^{13}$C{$^1$H} NMR (75.47 MHz, CDCl$_3$, ppm): δ=125.3 (C$_5$Me$_5$), 84.15(OCH$_2$), 77.93(OCMe$_2$), 65.75(CH$_2$CH$_2$N), 63.51(OMe), 62.58(CMe$_2$CH$_2$N), 48. 94(NMe), 32.88 (OCMe$_2$), 30.09 (CCMe$_2$), 11.79 (C$_5$Me$_5$).

Example 9

Synthesis of Cp*Ti(OMe)$_2$(OCMe$_2$CH$_2$NMe$_2$) (catalyst 9)

Preparation of HOCMe$_2$CH$_2$NMe$_2$ 20 ml(40 mmol) of dimethylamine (HNMe$_2$, 2M solution in MeOH), 3.17 g (46 mmol) of isobutylene oxide and a stirring bar are put into a 20 ml screw capped vial and mixed together in the vial at a room temperature for 12 hours, thereby obtaining a colorless viscous solution. The colorless viscous solution is transferred to a 250 ml flask, and a washing solution obtained by washing the vial with 20 ml of acetone three times is added to the colorless viscous solution. Solvent in the colorless viscous solution is removed in a rotary evaporator, and then the resultant material after the removal of the solvent is dried under the vacuum condition for a long time. As a result, 2.6 g (yield 55%) of a waterwhite liquid, HOCMe$_2$CH$_2$NMe$_2$, is obtained, and its $^1$H NMR result is as follows:

$^1$H NMR (300, 13 MHz, CDCl$_3$, ppm): δ=3.43(br s, 1H, OH), 2.33 (s, 6H, NMe$_2$), 2.24(s, 2H, CH$_2$N), 1.13(s, 6H, CMe$_2$). $^{13}$C{$^1$H} NMR (75.47 MHz, CDCl$_3$, ppm): δ=69.92 (OCMe$_2$), 61.02(CH$_2$N), 27.40(OCMe$_2$).

Preparation of Cp*Ti(OMe)$_2$(OCMe$_2$CH$_2$NMe$_2$) (catalyst 9)

2.42 mmol (0.284 g) of HOCMe$_2$CH$_2$NMe$_2$ which is synthesized according to the example 9 process described above is put into a first Schlenk flask and dissolved in 30 ml of toluene. Then, a temperature of the solution in the first Schlenk flask is lowered to −78° C. On the other hand, 2.42 mmol(0.67 g) of Cp*Ti(OMe)$_3$ is dissolved in 30 ml of toluene in a second Schlenk flask to obtain a separate solution. The separate solution is gradually added to the solution in the first Schlenk flask drop by drop. After all the separate solution is added to the solution in the first Schlenk flask, the solution mixture is gradually raised to a room temperature, and then agitated overnight. Then, solvent in the solution mixture is removed under the vacuum condition and the resultant material after the removal of the solvent is dried for a long time. As a result, 0.64 g (yield 88%) of yellow solid, catalyst 9 of the following formula 17 is obtained, and its $^1$H NMR result is as follows:

$^1$H NMR (300, 13 MHz, CDCl$_3$, ppm): δ=4.12(s, 6H, OMe), 2.68(s, 2H, CH$_2$N), 2.55(s, 6H, NMe$_2$), 1.98(s, 15H, C$_5$Me$_5$), 1.12(d, J=7.8 Hz, 6H, CMe$_2$). $^{13}$C{$^1$H} NMR (75.47 MHz, CDCl$_3$, ppm): δ=124.5(C$_5$Me$_5$), 76.34(OCMe$_2$), 65.29 (OMe), 63.75(NMe), 47.36(NMe$_2$), 34.51(OCMe$_2$), 11.33 (C$_5$Me$_5$).

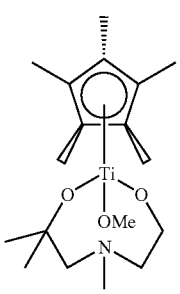

[Formula 16]

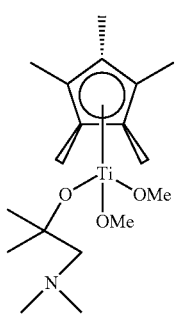

[Formula 17]

Example 10

Preparation of Styrene Polymer (in Solution Phase)

Liquid phase polymerization for producing styrene polymer is conducted using the half metallocene catalysts according to the examples 1 to 9. The polymerization process is as follows:

70 ml of purified heptane is introduced into a polymerization reactor filled with highly purified nitrogen and a temperature of the reactor is raised to 50° C. Then, 30 ml of styrene, 0.5 ml of tri-isobutyl aluminum (1.0M toluene solution) and 0.44 ml of methyl-aluminum oxane (2.1M toluene solution, purchased from Akzo Chemical Co.) are sequentially introduced into the reactor. While the reaction mixture in the reactor are agitated vigorously, 0.75 ml of toluene solution (containing 3.75 micromoles of Ti), in which one of the metallocene catalysts above is dissolved, is added to the reaction mixture in the reactor. After mixing the all the ingredients in the reactor for 1 hour, 10 wt % of hydrochloric acid-ethanol solution is introduced into the reactor to terminate the reaction. Then, the reaction product is filtered and white precipitate is obtained. The precipitate is washed with ethanol and dried at 50° C. in a vacuum oven overnight to obtain styrene polymer. The results of polymerization conducted using the catalysts according to the examples 1 to 9 of the present invention and natures of the produced polymers are shown in Table 1 for each catalyst. The respective polymers are extracted under reflux of methylethylketone for 12 hours, thereby obtaining polymers which remain without dissolving during the extraction. The extracted polymer is analyzed by a carbon nuclear magnetic resonance (NMR) spectroscopic investigation method, and it is found that the polymers have the syndiotatic structure.

Comparative Example 1

In this example, all the process steps and most of the materials are the same as used in the example 10 except the kinds of the catalyst. In this example, a conventional catalyst Cp*Ti(OMe)$_3$ is used. Polymerization results obtained using the conventional catalyst Cp*Ti(OMe)$_3$ and the nature of the resultant polymer are shown in Table 1.

Comparative Example 2

In this example, all the process steps and most of the materials are the same as used in the example 10 except the catalyst used. According to this example, a conventional catalyst Cp*Ti(OCH$_2$CH$_2$)N is used. Polymerization results obtained by using the conventional catalyst Cp*Ti(OCH$_2$CH$_2$)N and the nature of the resultant polymer are shown in Table 1.

Comparative Example 3

In this example, all the process steps and most of the materials are the same as used in the example 10 of the present invention except the catalyst used. According to this example, a conventional catalyst Cp*Ti(OCHMeCH$_2$)$_3$N is used. Polymerization results obtained by using the conventional catalyst Cp*Ti(OCH$_2$CH$_2$)$_3$N and the nature of the resultant polymer are shown in Table 1.

TABLE 1

Results of polymerization conducted in solution phase

| Catalyst | Yield (g) | Activity(kg PS/molTi · hr) | Syndiotacticity (%) | Molecular Weight (Mw) | Distribution Of Molecular Weight (Mw/Mn) | Melting Temp. (° C.) |
|---|---|---|---|---|---|---|
| 1 | 0.16 | 21 | 92 | 415,000 | 2.2 | 269 |
| 2 | 9.76 | 1302 | 94 | 575,000 | 1.9 | 272 |
| 3 | 3.68 | 495 | 92 | 523,000 | 1.9 | 271 |
| 4 | 9.74 | 1298 | 93 | 625,000 | 2.1 | 270 |
| 5 | 1.99 | 265 | 90 | 210,000 | 2.2 | 268 |
| 6 | 9.84 | 1313 | 93 | 594,000 | 2.0 | 268 |
| 7 | 2.15 | 287 | 91 | 176,000 | 2.9 | 266 |
| 8 | 9.33 | 1244 | 92 | 418,000 | 2.8 | 269 |
| 9 | 9.60 | 1280 | 95 | 467,000 | 2.0 | 267 |
| Comparative Example 1 Cp*Ti(OMe)$_3$ | 9.30 | 1240 | 91 | 245,000 | 2.1 | 269 |
| Comparative Example 2 Cp*Ti(OCH$_2$CH$_2$)$_3$N | 6.05 | 807 | 93 | 314,000 | 2.3 | 271 |
| Comparative Example 3 Cp*Ti(OCHMeCH$_2$)$_3$N | 3.14 | 418 | 90 | 287,000 | 2.2 | 270 |

Example 11

Preparation of Styrene Polymer (in Bulk Phase)

Polymerization of styrene in mass phase is conducted in the presence of the half metallocene catalysts according to the examples 1 to 9 of the present invention.

100 ml of purified styrene is introduced into a polymerization reactor filled with highly purified nitrogen and a temperature of the reactor is raised to 50° C. Then, 5 ml of tri-isobutyl aluminum (1.0M toluene solution) and 5 ml of methyl aluminoxane (2.1M toluene solution, purchased from Akzo Chemical Co.) are sequentially introduced into the reactor. While the contents in the reactor are mixed vigorously, 5 ml of toluene solution (containing 50 micromoles of Ti), in which one of the metallocene catalysts according to the examples 1 to 9, is dissolved, is introduced into the reactor. After mixing the reaction mixture in the reactor for 1 hour, 10 wt % of hydrochloric acid-ethanol solution is added to the reaction mixture to terminate the reaction. Then, the reaction product is filtered to obtain some precipitate. The precipitate is washed with ethanol and dried at 50° C. in a vacuum oven overnight to obtain the final product, styrene polymer. The results of polymerizations conducted in the presence of the metallocene catalysts according to the examples 1 to 9, and natures of the produced polymers are shown in Table 2 for each catalyst. The produced polymers are extracted under reflux of methylethylketone for 12 hours, thereby obtaining polymers which remain without dissolving. These polymers are analyzed by a carbon NMR spectroscopic investigation method, and it is found that the polymers have the syndiotatic structure.

Comparative Example 4

In this example, all the process steps and most of the materials are the same as used in the example 11 except the catalyst used. According to this example, a conventional catalyst Cp*Ti(OMe)$_3$ is used. Polymerization results obtained using the conventional catalyst Cp*Ti(OMe)$_3$ and the nature of the resultant polymer are shown in Table 2.

Comparative Example 5

In this example, all the process steps and most of the materials are the same as used in the example 11 except the catalyst used. According to this example, a conventional catalyst Cp*Ti(OCH$_2$CH$_2$)N is used. Polymerization results obtained using the conventional catalyst Cp*Ti(OCH$_2$CH$_2$)N and the nature of the resultant polymer are shown in Table 2.

TABLE 2

Results of polymerization of styrene in bulk phase

| Catalyst | Yield (g) | Activity (kg PS/ molTi · hr) | Molecular Weight (Mw) | Distribution Of Molecular Weight (Mw/Mn) | Melting Temp. (° C.) |
|---|---|---|---|---|---|
| 2 | 69.2 | 1384 | 623,000 | 2.1 | 269 |
| 4 | 68.8 | 1376 | 674,000 | 1.9 | 270 |
| 6 | 67.4 | 1380 | 594,000 | 2.1 | 269 |
| Comparative Example 4 Cp*Ti(OMe)$_3$ | 64.0 | 1280 | 567,000 | 2.3 | 269 |
| Comparative Example 5 Cp*Ti(OCH$_2$CH$_2$)$_3$N | 47.9 | 958 | 581,000 | 2.0 | 270 |

Referring to tables 1 and 2, it is found that the styrene polymers produced using the half metallocene catalysts according to the present invention have excellent syndiotacticity, high melting point and broad molecular weight distribution.

The metallocene catalyst according to the present invention provides at least the following advantages.

First, the metallocene catalyst composed of i) a transition metal center selected from Groups 3 to 10 in the periodic table, ii) a cycloalkanedienyl group, and iii) either a triethanolamine compound or an N-alkyldiethanolamine compound, both of which have a plurality of binding sites and high steric hinderance, constitutes a high activity catalyst system together with a cocatalyst such as alkyl aluminum oxane, thereby rendering syndiotatic styrene polymers and/or styrene-olefin copolymers capable of being produced.

Second, the metallocene catalyst according to the present invention is capable of producing polymer having high heat resistance, high chemical resistance, and high processibility, so that the polymer produced using the metallocene catalyst according to the present invention can be diversely applied to engineering plastics.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. A half metallocene catalyst represented by the formula 1, 2 or 3:

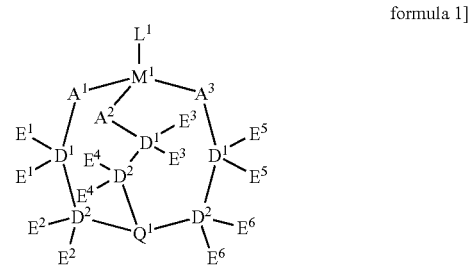

[formula 1]

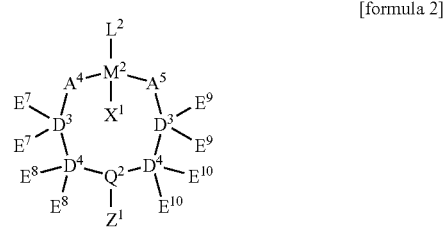

[formula 2]

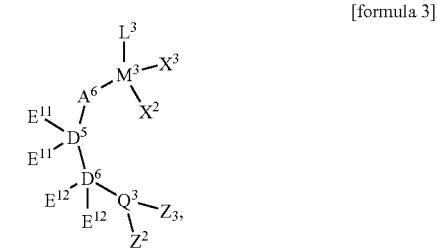

[formula 3]

wherein, $M^1$, $M^2$ and $M^3$ are transition metals independently selected from the group consisting of atoms in Groups 3, 4, 5, 6, 7, 8, 9, 10 of the Periodic Table, and Each of $L^1$, $L^2$ and $L^3$ is a cycloalkanedienyl ligand represented by the formula 4, 5, 6, 7 or 8:

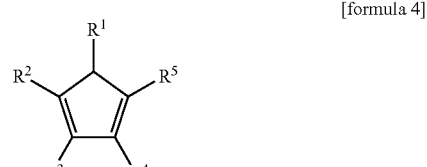

[formula 4]

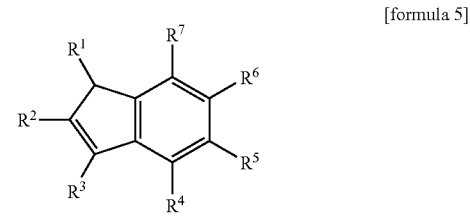

[formula 5]

-continued

[formula 6]

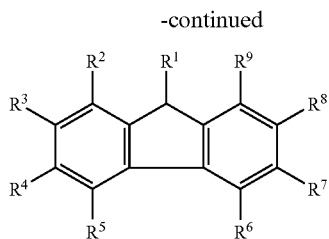

[formula 7]

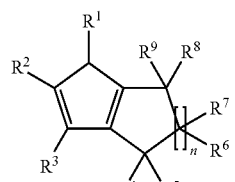

[formula 8]

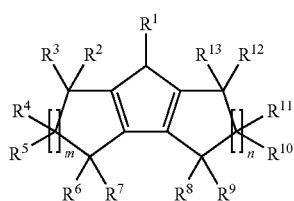

wherein, $R^1, R^2, R^3, R^4, R^5, R^6, R^7, R^8, R^9, R^{10}, R^{11}, R^{12}$, and $R^{13}$ are independently hydrogen atom, halogen, alkyl, $C_{3-20}$ cycloalkyl, $C_{2-20}$ oalkenyl, alkylsilyl, haloalkyl, alkoxy, alkylsiloxy, amino, alkoxyallcyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $c_{1-20}$ hydrocarbon group having straight or branch structure and the aryl group is $C_{6-40}$ aromatic or heteroaromatic group) and each of m and n is an integer of 1 or more;

$X^1, X^2$, and $X^3$, which are σ-ligand functional groups, are independently hydrogen atom, halogen, alkyl, $C_{3-20}$ cycloalkyl, alkylsilyl, $C_{2-20}$ alkenyl, alkoxy, alkenyloxy, thioalkoxy, alkylsiloxy, amide, alkoxyalcohol, alcoholamine, aryl, alkylaryl, arylalkyl, arylsilyl, haloaryl, aryloxy, arylalkoxy, thioaryloxy, arylalkylsiloxy, arylamide, arylalkylamide, aryloxoalcohol, alcohoarylamine, or arylaminoaryloxy group (here, the alkyl group is $c_{1-20}$ hydrocarbon group having straight or branch structure and the aryl group is $C_{6-40}$ aromatic or hetero aromatic group);

$A^1, A^2, A^3, A^4, A^5$ and $A^6$ are functional groups bounded to a central metal and are independently oxygen atom or sulfur atom;

$D^1, D^2, D^3, D^4, D^5$ and $D^6$ are a carbon atom, respectively;

$E^1, E^2, E^3, E^4, E^5, E^6, E^7, E^8, E^9, E^{10}, E^{11}$, and $E^{12}$ are independently hydrogen atom, halogen, alkyl, $C_{3-20}$ cycloalkyl, $C_{2-20}$ alkenyl, alkylsilyl, haloalkyl, alkoxy, alkylsiloxy, amino, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxy, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is $c_{1-20}$ hydrocarbon group having straight or branch structure and the aryl group is $C_{6-40}$ aromatic or heteroaromatic group), wherein all of $E^1, E^2, E^3, E^4, E^5$, and $E^6$ are not simultaneously hydrogen atom, all of $E^7, E^8, E^9$, and $E^{10}$ are not simultaneously hydrogen atom, and all of $E^{11}$ and $E^{12}$ are not simultaneously hydrogen atom;

$Q^1, Q^2$ and $Q^3$ are independently nitrogen or phosphorous; and $Z^1, Z^2$ and $Z^3$ are independently hydrogen atom, alkyl, $C_{3-20}$ cycloalkyl, $C_{2-20}$ alkenyl, alkylsilyl, haloalkyl, alkoxyalkyl, thioalkoxyalkyl, alkylsiloxyalkyl, aminoalkyl, alkylphosphinoalkyl, aryl, arylalkyl, alkylaryl, arylsilyl, arylalkylsilyl, haloaryl, aryloxoalkyl, thioaryloxoalkyl, aryloxoaryl, arylsiloxy, arylalkylsiloxy, arylsiloxalkyl, arylsiloxoaryl, arylamino, arylaminoalkyl, arylaminoaryl or arylphosphinoalkyl group (here, the alkyl group is a $C_{1-20}$ hydrocarbon group having the straight or branch structure and the aryl group is a $C_{6-40}$ aromatic or heteroaromatic group).

2. The half metallocene catalyst of claim 1, wherein the half metallocene catalyst is represented by any one of the formulas 9, 10, 11, 12, 13, 14, 15, 16 and 17:

[formula 9]

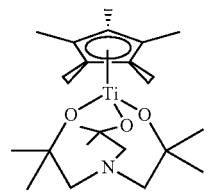

[formula 10]

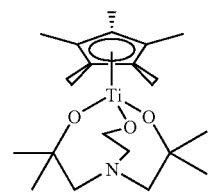

[formula 11]

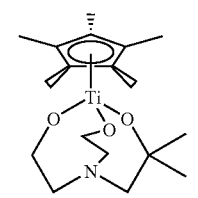

[formula 12]

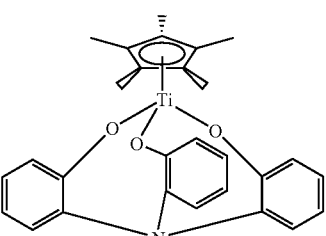

[formula 13]

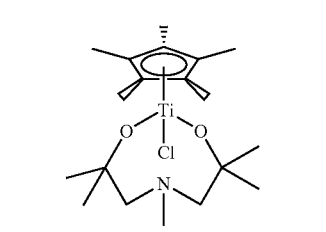

-continued

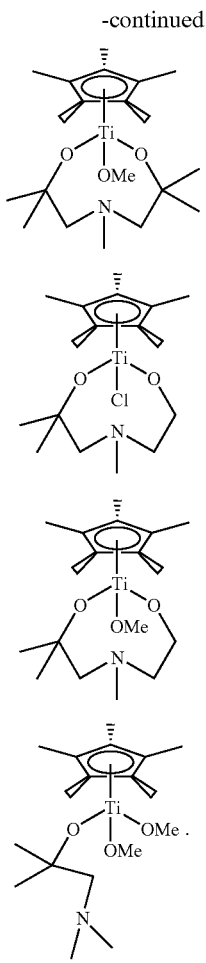

[formula 14]

[formula 15]

[formula 16]

[Formula 17]

3. A process for preparing a styrene polymer by homopolymerizing styrene monomers (styrene or styrene derivatives), copolymerizing styrene monomers (styrene and styrene derivatives) or copolymerizing the styrene monomers with olefins monomers (olefin and olefin derivatives) using a catalyst system, wherein the catalyst system comprises:
 a main catalyst of the metallocene compound of claim 1; and
 one or more cocatalysts selected from the group consisting of alkylaluminoxane of the formula 18, alkylaluminum of the formula 19 and weak coordinate Lewis acid,

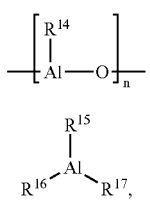

[formula 18]

[formula 19]

wherein, $R^{14}$ is a hydrogen atom, substituted or unsubstituted alkyl, substituted or unsubstituted $C_{3-20}$ cycloalkyl, aryl, alkylaryl or arylalkyl group; and $R^{15}$, $R^{16}$ and $R^{17}$ are independently hydrogen atom, halogen, substituted or unsubstituted alkyl, substituted or unsubstituted $C_{3-20}$ cycloalkyl, aryl, alkylaryl or arylalkyl group (here, the alkyl group is a $C_{1-20}$ hydrocarbon group having the straight or branch structure and the aryl group is a $C_{6-40}$ aromatic or heteroaromatic group) where at least one of the $R^{15}$, $R^{16}$ and $R^{17}$ includes the alkyl group and n is an integer ranging from 1 to 100.

4. The process of claim 3, wherein the half metallocene compound includes a central metal of $10^{-8}$ to 1.0M.

5. The process of claim 3, wherein a mole ratio of the alkylalumonoxane to the half metallocene compound ranges from 1:1 to $10^6$:1.

6. The process of claim 3, wherein a mole ratio of the alkylaluminum to the half metallocene compound ranges from 1:1 to $10^4$:1.

7. The process of claim 3, wherein a mole ratio of the weak coordinate Lewis acid to the half metallocene compound ranges from 0.1:1 to 50:1.

8. The process of claim 3, wherein the polymerization is conducted at a temperature m the range of from −80 to 200° C.

9. The process of claim 3, wherein a styrene pressure is in the range of from 0.01 to 20 atm when polymerization for homopolymerizing the styrene monomers is conducted.

10. The method of claim 3, wherein polymerization pressure is in the range of from 1 to 1000 atm including the pressure of comonomers.

11. The process of claim 3, wherein each of the styrene derivatives has one or more substituent on a benzene ring, and the substituent is selected from the group consisting of halogen, alkyl, alkoxy, ester, thioalkoxy, sillyl, tin, amine, phosphine, halogenated alkyl, $C_{2-20}$ vinyl, aryl, vinylaryl, alkylaryl, and arylalkyl group, where the alkyl group is $C_{1-10}$ hydrocarbon group having the straight or branch structure, and the aryl group is $C_{4-60}$ aromatic or heteroaromatic group.

12. The process of claim 3, wherein the olefin monomer is selected from the group consisting of $C_{2-20}$ cycloolefin, cyclodiolefin and $C_{4-20}$ diolefin.

13. The process of claim 3, wherein the polymer is styrene homopolymer, styrene derivative homopolymer, copolymer of styrene and its derivative, copolymer of styrene and olefin, or copolymer of styrene derivative and olefin.

14. The process of claim 3, wherein the polymerization is conducted by a slurry phase polymerization, a liquid phase polymerization, a gas phase polymerization and a bulk state polymerization.

15. The process of claim 3, wherein the polymerization is conducted by sequentially injecting solvent, the styrene monomer, the alkylaluminum, the cocatalyst and the half metallocene compound into a reactor.

16. The process of claim 3, wherein the main catalyst is activated by the cocatalyst selected from the group consisting of alkylaluminoxane of the formula 18, alkylaluminum of the formula 19 and weak coordinate Lewis acid in advance, and then the activated main catalyst is introduced into a reactor containing the monomers therein.

17. The process of claim 3, wherein the polymerizing comprises the steps of:
 i) applying alkylaluminum to the styrene monomers;
 ii) activating the metallocene compound serving as the main catalyst by bring the metallocene compound into contact with the cocatalyst; and
 iii) introducing the activated main catalyst of step ii) into a reactor charged with the styrene monomers and alkylaluminum to cause polymerization.

18. The process of claim 3, wherein activation of the main catalyst is performed at a temperature in the range of from 0 to 150° C. for 0.1 to 240 minutes.

* * * * *